US007825288B2

(12) United States Patent
Chekhmir et al.

(10) Patent No.: US 7,825,288 B2
(45) Date of Patent: *Nov. 2, 2010

(54) PROCESS AND COMPOSITION FOR THE IMMOBILIZATION OF RADIOACTIVE AND HAZARDOUS WASTES IN BOROSILICATE GLASS

(75) Inventors: Anatoly Chekhmir, Ma'aleh Adumim (IL); Arthur Gribetz, Jerusalem (IL)

(73) Assignee: GeoMatrix Solutions, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/488,800

(22) Filed: Jun. 22, 2009

(65) Prior Publication Data
US 2010/0022380 A1 Jan. 28, 2010

Related U.S. Application Data

(60) Division of application No. 11/333,236, filed on Jan. 18, 2006, now Pat. No. 7,550,645, which is a continuation-in-part of application No. 11/068,460, filed on Feb. 23, 2005, now Pat. No. 7,019,189.

(60) Provisional application No. 60/546,202, filed on Feb. 23, 2004.

(51) Int. Cl.
*G21F 9/16* (2006.01)
*G21F 1/00* (2006.01)
*B09B 3/00* (2006.01)
*C03C 3/118* (2006.01)
*C03C 3/091* (2006.01)
*C03C 3/087* (2006.01)
*C03C 3/064* (2006.01)

(52) U.S. Cl. ............................. 588/11; 588/14; 588/15; 588/16; 588/252; 501/59; 501/66; 501/70; 501/77

(58) Field of Classification Search ..................... None
See application file for complete search history.

(56) References Cited

U.S. PATENT DOCUMENTS

| | | | |
|---|---|---|---|
| 3,000,072 A | 9/1961 | Evans | |
| 3,249,551 A | 5/1966 | Bixby | |
| 3,837,872 A | 9/1974 | Conner | |
| 3,959,172 A | 5/1976 | Brownell et al. | |
| 4,028,265 A | 6/1977 | Barney et al. | |
| 4,119,561 A | 10/1978 | Drobnik et al. | |
| 4,224,177 A | 9/1980 | Macedo et al. | |
| 4,274,976 A | 6/1981 | Ringwood | |
| 4,297,304 A | 10/1981 | Scheffler et al. | |
| 4,329,248 A | 5/1982 | Ringwood | |
| 4,351,749 A | 9/1982 | Ropp | |
| 4,354,954 A | 10/1982 | Koster et al. | |
| 4,363,757 A | 12/1982 | Koster et al. | |
| 4,377,507 A | 3/1983 | Pope et al. | |
| 4,464,294 A | 8/1984 | Thiele | |
| 4,488,990 A | 12/1984 | Yannopoulos | |
| 4,528,011 A | 7/1985 | Macedo et al. | |
| 4,534,893 A | 8/1985 | Dippel et al. | |
| 4,632,778 A | 12/1986 | Lehto et al. | |
| 4,797,232 A | 1/1989 | Aubert | |
| 4,868,141 A * | 9/1989 | Fine ............................ 501/59 |
| 5,102,439 A | 4/1992 | Jantzen | |
| 5,256,338 A | 10/1993 | Nishi et al. | |
| 5,649,894 A | 7/1997 | White et al. | |
| 5,656,009 A | 8/1997 | Feng et al. | |
| 5,711,016 A | 1/1998 | Carpena et al. | |
| 5,750,824 A | 5/1998 | Day | |
| 5,771,472 A | 6/1998 | Carpena et al. | |
| 5,882,581 A | 3/1999 | Gotovchikov et al. | |
| 5,926,771 A | 7/1999 | Brown | |
| 5,926,772 A | 7/1999 | Kalb et al. | |
| 5,947,887 A | 9/1999 | White et al. | |
| 5,960,368 A | 9/1999 | Pierce et al. | |
| 5,994,609 A | 11/1999 | Luo | |
| 6,023,006 A | 2/2000 | Fiquet et al. | |
| 6,160,238 A | 12/2000 | Titus et al. | |
| 6,258,994 B1 | 7/2001 | Jantzen et al. | |
| 6,329,563 B1 | 12/2001 | Cicero-Herman et al. | |
| 6,472,579 B1 | 10/2002 | Anshits et al. | |
| 6,734,334 B2 | 5/2004 | Chekhmir et al. | |
| 2002/0038070 A1 | 3/2002 | Chekhmir et al. | |
| 2002/0103069 A1 | 8/2002 | Young | |
| 2002/0111525 A1 | 8/2002 | Pal et al. | |
| 2004/0024277 A1 | 2/2004 | Mulcey et al. | |

FOREIGN PATENT DOCUMENTS

| EP | 004397 A1 | 3/1979 |
|---|---|---|
| WO | WO 97-19034 | 5/1997 |
| WO | WO 2005/084756 | 9/2005 |

OTHER PUBLICATIONS

Bottinga, et al.; The Viscosity of Magmatic Silicate Liquids: A Model for Calculation, American Journal of Science, May 1972, 272, pp. 438-475.
U.S. Dept. of Energy, Office of Civilian Radioactive Waste Management: Waste Acceptance System Requirements Document (WSRD), Revision 4, Jan. 2002, pp. 33-34.
Pacific Northwest National Laboratory, PNNL-13582: High-Level Waste Melter Study Report; submitted to U.S. Department of Energy Jul. 2001, Section 3.0 and Appendix C.
U.S. Dept. of Energy, Office of Waste Management; High-Level Waste Borosilicate Glass: A Compendium of Corrosion Characteristics, vol. 2, Mar. 1994, pp. 267-282.

(Continued)

*Primary Examiner*—Melvin C Mayes
*Assistant Examiner*—Guinever S Gregorio
(74) *Attorney, Agent, or Firm*—Pillsbury Winthrop Shaw Pittman LLP

(57) ABSTRACT

The present invention provides processes to immobilize radioactive and/or hazardous waste in a borosilicate glass, the waste containing one or more of radionuclides, hazardous elements, hazardous compounds, and/or other compounds. The invention also provides borosilicate glass compositions for use in immobilizing radioactive and/or hazardous waste.

10 Claims, No Drawings

OTHER PUBLICATIONS

Lutze, et al.; Radioactive Waste Forms for the Future; Eisevier Science Publishers B.V., 1998, Chapter 1, pp. 24-29.

Persikov, Edward S.; The Viscosity of Magmatic Liquids; Experiment, Generalized Patterns. A Model for Calculation and Prediction Applications; Advances of Physical Chemistry of Magmas (Springer-Verlag, 1991), Chapter 1, pp. 1-40.

E.K. Hansen, et al.; Mixing Envelope D Sludge with LAW Intermediate Products with and without Glass Formers, Westinghouse Savannah River Company, Sep. 2001, Table B-40, p. 116, Table B-41, p. 117 and Table B-42, p. 119-120.

G.L. Smith et al.; Verification and Product Testing of C-104 and AZ-102 Pretreated Sludge Mixed with Flowsheet Quantities of Secondary Wastes, Feb. 2001, Table 3.6, pp. 3.10-3.11, and Table 3.9, pp. 3.12-3.13.

Chekhmir, et al., Diffusion in Magmatic Melts: New Study, found in Chapter 3, Physical Chemistry of Magmas, pp. 99-119.

Epelbaum et al.; Zonality of Crystal is One More Possible Barrier to Migration of Radionuclides, Geological Problems of Radioactive Waste Burial, Contribution of Physical-Chemical Petrology. vol. 18 (Miass, 1994), pp. 126-138. (partial translation only).

U.S. Dept. of Energy, Office of Environmental Management; Waste Acceptance Product Specifications for Vitrified High-Level Waste Forms, WAPS, Dec. 1996, pp. 1, 5-6, 23, 30-31.

Carron, Jean-Paul; Vue d'ensemble sur las reélogie des magmas silicates naturels, Laboratoire de gélogie de l'École normale supérieure, Paris, Bull. Soc. Fr. Minéral. Cristalloger. (1969), 92, 435-446.

Huang et al., "Properties and Solubility of Chrome in Iron Alumina Phosphate Glasses Containing High Level Nuclear Waste", *Glass Science and Technology*, 2004, vol. 77, No. 5, abstract, ISSN 0946-7475.

\* cited by examiner

PROCESS AND COMPOSITION FOR THE IMMOBILIZATION OF RADIOACTIVE AND HAZARDOUS WASTES IN BOROSILICATE GLASS

CROSS-REFERENCE TO RELATED APPLICATIONS

The present application is a division of U.S. application Ser. No. 11/333,236, filed Jan. 18, 2006, now U.S. Pat. No. 7,550,645, which is a continuation-in-part of U.S. patent application Ser. No. 11/068,460, filed Feb. 23, 2005, now U.S. Pat. No. 7,019,189, and claims the priority of U.S. Provisional Application No. 60/546,202, filed Feb. 23, 2004. Each of the above applications and patents are herein incorporated by reference in their respective entireties.

U.S. patent application Ser. No. 10/606,218 entitled "Processes for Immobilizing Radioactive and Hazardous Wastes" and filed on Jun. 26, 2003 now U.S. Pat. No. 7,091,393, is incorporated by reference herein in its entirety.

BACKGROUND

1. Field of the Invention

The present invention relates generally to treatment of radioactive and hazardous wastes, and more particularly to processes for immobilizing a waste containing one or more of radionuclides, hazardous elements, hazardous compounds, and other compounds present in the waste.

2. Background of the Invention

The use of radioactive and hazardous materials in the world has led to the accumulation of a significant amount of radioactive and hazardous wastes. There is an international consensus regarding the planned disposal of these wastes by burying them in the ground in deep geological repositories. At the present time, high-level radioactive wastes are being placed in long-term storage awaiting permanent disposal. Once buried, with the passage of time, groundwater and hydrothermal solutions can make contact with the radionuclides, hazardous elements, or hazardous compounds contained in the wastes. As a result, groundwater and hydrothermal solutions can facilitate the leaching of radionuclides, hazardous elements, and hazardous compounds out of the wastes into the biosphere in which plants and animals live. In addition, even without the interference from groundwater and hydrothermal solutions, radionuclides, hazardous elements, or hazardous compounds could possibly diffuse out of the wastes, resulting in contamination of the biosphere. Therefore, improper containment of the wastes can create a significant problem.

There are a number of existing processes that can potentially reduce the leaching and/or diffusion of radioactive and hazardous wastes. The existing processes, however, have various disadvantages. For example, cementation is commonly used to immobilize low-level and intermediate-level radioactive waste. This process is undesirable because a large volume of cement is required to immobilize a small quantity of wastes. Furthermore, cement is highly susceptible to both leaching and diffusion.

The most common method of handling high-level radioactive wastes is vitrification in borosilicate glass. Vitrification is currently being used in a number of countries including France, the United States of America, Korea, Italy, Germany, the United Kingdom, Japan, Belgium, China, and Russia. Conventional vitrification processes, however, are limited in the amount of waste that can be contained, and efforts to increase waste loading capacity of borosilicate glasses or melts have led to high crystallinity, increased rates of leaching, and increased corrosion of the melter, rendering the compositions unsuitable for use in conventional vitrification melters.

Thus, a need exists for improved vitrification processes and borosilicate glass compositions that achieve higher waste loading without the above-mentioned disadvantages on use of the processes and compositions with conventional vitrification melters.

BRIEF SUMMARY OF THE INVENTION

The present invention provides a process for immobilizing radioactive and/or hazardous waste in a borosilicate glass, and compositions for use in the processes. In one aspect of the present invention, a process is provided for immobilizing waste comprising combining the waste with glass-forming components and fluorine in particular proportions, melting the mixture to form a glass with integrated waste with properties suitable for waste vitrification melters, pouring the melted glass with integrated waste into a receptive canister, and solidifying the melted glass with integrated waste by cooling to form a highly polymerized glass, preferably peraluminous, and a glass whose components fall within a designated compositional range.

In another aspect of the present invention, a process is provided for immobilizing waste comprising combining the waste with glass-forming components and fluorine in particular proportions, melting the mixture at a temperature of up to about 1200° C., to form a low viscosity melted glass having a viscosity of about 2 to about 10 Pascal second, with properties suitable for waste vitrification melters, pouring the melted glass with integrated waste into a receptive canister, and solidifying the melted glass with integrated waste by cooling to form a highly polymerized glass, preferably peraluminous, and a glass whose components fall within a designated compositional range.

In a further aspect of the present invention, a process is provided for the immobilization of radioactive and/or hazardous waste in a borosilicate glass. In the process, highly polymerized glass (glass with low numbers of non-bridging oxygen atoms (NBO)) is formed, and used as an immobilizing matrix for radioactive and hazardous waste. The process involves melting together glass-forming and waste components consisting essentially of three groups of compounds: ($R_2O+RO$), $R_2O_3$, and ($RO_2+R_2O_5$), in a ratio of about (1-1.3):(1-1.4):(1.2-4.2), where the final product must also include fluorine in an amount ranging between about 1 and about 3 weight percent. In a preferred embodiment, the ratio between ($R_2O+RO$) and $R_2O_3$ is less than or equal to 1.

In yet another aspect of the present invention, a glass composition is provided for the immobilization of radioactive and/or hazardous waste. The glass is a highly polymerized glass consisting essentially of three groups of compounds ($R_2O+RO$), $R_2O_3$, and ($RO_2+R_2O_5$), present in a ratio of about (1-1.3):(1-1.4):(1.2-4.2), where $SiO_2$ is present in an amount greater than 30 weight percent, $B_2O_3$ is present in an amount between 8.7 and 15.3 weight percent, $Al_2O_3$ is present in an amount between 7 and 15.1 weight percent, CaO is present in an amount between 0.2 and 2.3 weight percent, and further where fluorine is present in an amount ranging between about 1 and about 3 weight percent.

The glass formed by these processes, and according to these compositions, incorporates a substantially higher percentage of waste than previously practiced, while at the same time satisfying both the processing requirements and waste form acceptance criteria for glasses produced in waste vitrification melters. Additional advantages and features of the present invention will be apparent from the following drawings, detailed description and examples which illustrate preferred embodiments of the invention.

DETAILED DESCRIPTION OF THE INVENTION

Reference will now be made in detail to the presently preferred embodiments of the invention, which, together with the following examples, serve to explain the principles of the invention. These embodiments are described in sufficient detail to enable those skilled in the art to practice the invention, and it is to be understood that other embodiments may be utilized, and that structural, chemical, and physical changes may be made without departing from the spirit and scope of the present invention.

Definitions

The term "waste" includes waste materials, such as fission products, which contain radionuclides, hazardous elements, radioactive compounds, hazardous compounds, and/or other components present in the waste. Waste mixtures can include, for example, the following elements and their compounds: Fe, Na, P, Cr, Al, Mn, Ni, Na, Zr, K, Cs, Ru, Sr, Ba, Tc, Rh, Mg, I, lanthanides, actinides (for example, Th, U, Pu, Np, Am, Cm, and Ce), and their compounds, and other components of radioactive and hazardous waste. The waste may also include noble metals and volatile components such as $H_2O$ and/or $CO_2$. Not all of these elements and their compounds, if separated, are hazardous.

The term "radionuclide" includes any nuclide that emits radiation, including one or more of alpha, beta, and gamma emissions. The term "nuclide" includes an atomic species in which all atoms have the same atomic number and mass number. However, processes in which mixtures of different radionuclides are immobilized are specifically included within the scope of the present invention. Examples of radionuclides are Sr and Cs, and actinides and lanthanides, such as thorium and uranium.

The term "radioactive waste" includes three levels of radioactive wastes classified as follows:

1. "Low-level radioactive wastes" are generated primarily from hospitals, laboratories, and the industrial sector. Low-level radioactive wastes are also generated from constituents that removed from high-level radioactive wastes. Low-level radioactive wastes represent about 90% by volume but only about one percent by radioactivity of all radioactive wastes in the world.
2. "Intermediate-level radioactive wastes" comprise resins, chemical sludge, and nuclear reactor components. Intermediate-level radioactive wastes represent about seven percent by volume and about four percent by radioactivity of all radioactive wastes in the world.
3. "High-level radioactive wastes" comprise spent nuclear reactor fuel (spent fuel) and other high-level radioactive wastes generated principally from reprocessing the spent fuel and from nuclear weapons development. High-level radioactive wastes represent only about three percent by volume but about 95% by radioactivity of all radioactive wastes in the world.

The term "element" used in the context of radioactive or hazardous elements includes an atomic element of the periodic table. The term "compound" used in the context of hazardous or radioactive compounds includes a substance composed of two or more elements.

The term "hazardous wastes" is defined in the EPA Environmental Glossary as any waste or combination of wastes which pose a substantial present or potential hazard to human health or living organisms because such wastes are non-degradable or persistent in nature or because they can be biologically magnified, or because they can be lethal, or because they may otherwise cause or tend to cause detrimental cumulative effects.

Because many of the compounds of waste mixtures are converted to oxides in a vitrification process, the mixtures are commonly referred to in terms of their "waste oxides" content. The term "waste oxide loading", "loading of waste oxides", "waste loading", or "loading of waste" refers to the weight percentage of the waste mixture (once it is thermally converted to oxides in a vitrification process and which can include non-hazardous components) in the final product of a waste immobilizing process.

As used herein, a "highly polymerized glass" is a glass that has low numbers of non-bridging oxygen (NBO) atoms; a "peraluminous" glass is a glass containing more $R_2O_3$ than $(R_2O+RO)$; a "peralkaline" glass is a glass containing more $(R_2O+RO)$ than $R_2O_3$; "Network forming components" are tetrahydrally coordinated cations that are components of $R_2O_3$ and $(RO_2+R_2O_5)$; "Network modifying components" are highly coordinated cations that are components of RO and $R_2O$. As used herein, the abbreviation "wt %" means weight percent.

Description

Glasses that have low numbers of NBO (highly polymerized glass) are more chemically durable and less likely to crystallize than glasses with more NBO (low polymerized glass). Examples of fully polymerized glass (100% polymerized with no NBO present in the glass) are feldspar glass compositions, plagioclase glass compositions, and pure silica glass compositions. Examples of highly polymerized glass (~90% or greater polymerization with low numbers of NBO) are natural glasses such as obsidian. Fully or highly polymerized glass has a greater capacity to incorporate additional components while maintaining the chemical durability of the glass than do low or depolymerized glass. This is due to the fact that highly polymerized structures have many more bonds to be broken than do low polymerized structures. In addition, in low polymerized glasses, alkali and alkaline ions are bonded with NBO and therefore are more mobile and reactive. They more easily exchange with hydronium ions in water and also cause more crystallization than when they are more tightly bonded in glasses with few NBO.

Highly polymerized melts or glasses have extremely high viscosities and are therefore not suitable for vitrification in conventional waste vitrification melters, which process in the temperature range of 1150-1200° C. In the case of albite, for example, when melted to 1200° C., the melt has a viscosity of approximately $10^5$ Pascal second. This is due to the fact that the melt is being heated only about 87° C. above its melting point (1113° C.). In the case of plagioclase glass compositions or feldspar glass compositions, for example, when melted to 1150° C., the melt has a viscosity of approximately $10^4$ Pascal second. This viscosity is estimated using E. Persikov's model based on the Carron principle. The same viscosity is calculated using the Y. Botting a and D. F. Weill model, as described in *The Viscosity of Magmatic Silicate Liquids; a Model for Calculation*, Amer. J. Sci., 272, pp. 438-475.

There are several ways to reduce viscosity in highly polymerized glass. For example, the addition of alkalis breaks Si—O bonds and creates NBOs, thereby reducing viscosity. Another method for reducing viscosity is by adding glass-forming components or fluxes, e.g. $B_2O_3$, which reduce the melting temperature of the material. The most effective flux is fluorine. In contrast to other fluxes, even the first 2 wt % of fluorine in the glass may decrease viscosity several times more than that provided by the same amount of alkali(s). Although this characteristic of fluorine is known, the deliberate use of fluorine has been purposefully avoided in waste vitrification glass formulations due to its chemical reactivity, which may cause corrosion in waste vitrification melters or other waste treatment unit operations. Additionally, higher fluorine concentrations can lead to phase separation in some glass forming systems.

Fluorine may either be originally present in the waste or may be added anytime later to the waste or may be partially found as an original component of the waste and partially as a later additive to the waste. However, a low concentration of fluorine (up to about 3 wt %) may dramatically reduce viscosity while not having any significant adverse effect on the melter, or other waste treatment process components. The viscosity of the glass compositions developed according to this invention is relatively low (approximately 2 to 10 Pascal second at glass processing temperatures).

Although fully or highly polymerized glass has a greater capacity to incorporate additional components while maintaining the chemical durability of the glass than does low or depolymerized glass, highly polymerized glasses inherently have high viscosities that render them unsuitable for use in conventional vitrification melters. The advantage of our invention is two-fold: firstly, it enables higher waste loadings than have been previously achieved using borosilicate glass in existing vitrification systems while also satisfying processing and product quality requirements for waste vitrification (i.e., viscosity, electrical resistivity, crystallization, and chemical durability. For example, the borosilicate glass compositions of this invention have specific electrical resistivity ranging between about 1.4 $\Omega$cm to about 10 $\Omega$cm at about 1150 degrees Celsius, that is acceptable for processing in vitrification melters, and meet the leaching requirements of less than about 1.19 grams per square meter per day for boron, less than about 0.69 grams per square meter per day for lithium, and less than about 0.95 grams per square meter per day for sodium, for acceptance in U.S. high-level waste repositories. See, for example, U.S. DOE/RW Waste Acceptance System Requirements Document (WASRD), and the *Tanks Focus Area High-Level Waste Melter Study Report*, prepared in July 2001 for the U.S. Department of Energy by Pacific Northwest National Laboratory, Section 3.0, for processing and product quality requirements in the U.S. See, for example, DOE-EM-0177, *High-Level Waste Borosilicate Glass: A Compendium of Corrosion Characteristics*, U.S DOE, 1994, for product requirements outside the U.S. See, for example, Radioactive Waste Forms for the Future, eds. W. Lutze and R. C. Ewing, Elsevier Science, 1988, Chapter 1, for processing and product requirements outside the U.S.) Secondly, it enables the achievement of these high waste loadings according to an algorithm, without necessitating empirical trial and error. Both of these advantages render this invention commercially valuable.

The degree of polymerization of a glass is determined by the molar ratio between (a) the sum of monovalent cation oxides ($R_2O$) and divalent cation oxides (RO) which are network modifying components, (b) trivalent cation oxides ($R_2O_3$) which are network forming components, and (c) the sum of tetravalent cation oxides ($RO_2$) and pentavalent cation oxides ($R_2O_5$), which are also network forming components. Examples of monovalent cation oxides are $Li_2O$, $Na_2O$ and $K_2O$. Examples of divalent cation oxides are CaO, MgO and SrO. Examples of trivalent cation oxides are $Al_2O_3$ and $B_2O_3$. Examples of tetravalent cation oxides are $SiO_2$ and $ZrO_2$, and $MnO_2$. Although manganese is found as MnO in the waste compositions presented in the examples, it can be present in various redox states, and therefore, for the purpose of subsequent calculations we assign Mn to the "$RO_2$" group. An example of a pentavalent cation oxide is $P_2O_5$. A shorthand manner of depicting or referring to this molar ratio used herein is ($R_2O+RO$):$R_2O_3$:($RO_2+R_2O_5$). As used herein, "$R_2O$" refers to a monovalent cation oxide, "RO" refers to a divalent cation oxide, "$R_2O_3$" refers to a trivalent cation oxide, "$RO_2$" refers to a tetravalent cation oxide, and "$R_2O_5$" refers to a pentavalent cation oxide."

The closer a glass' molar ratio of ($R_2O+RO$):$R_2O_3$:($RO_2+R_2O_5$) is to that of a fully polymerized glass such as a feldspathic composition (1:1:6) or a plagioclase composition (between 1:1:6 and 1:1:2), or to a highly polymerized natural glass such as obsidian (1:1:6), the higher the polymerization of the glass. In contrast, the closer a glass' molar ratio of ($R_2O+RO$):$R_2O_3$:($RO_2+R_2O_5$) is to that of a low polymerized glass such as a glaucophane composition (5:2:8), the lower the polymerization of the glass. In fact, the critical determinant responsible for a fully or highly polymerized glass is the ($R_2O+RO$):$R_2O_3$ part of the ratio, which should be ~1:1. It is preferable that the molar part of ($R_2O+RO$) is equal to or less than the molar part of $R_2O_3$, because this results in a peraluminous glass. Peraluminous glasses are generally more stable than peralkaline glasses, and therefore peraluminous glasses enable higher waste loadings than peralkaline glasses.

The degree of polymerization of a glass determined by the molar ratio ($R_2O+RO$):$R_2O_3$:($RO_2+R_2O_5$) may be numerically calculated using the Carron equation (Carron, J. P. (1969) *Vue d'ensemble sur la rheologie des magmas silicates naturels*, Bul. Soc. Franc. Miner. Cristallogr., 92, 435-446). The Carron equation is as follows:

$$K=NBO/T*100=[2(O-2T)/T]*100$$

wherein "K" is the degree of polymerization; "NBO" stands for the "Non-Bridging Oxygen" in the melt; "T" is the total number of network forming gram-ions (such as $Al^{3+}$, $Fe^{3+}$, $B^{3+}$, $Si^{4+}$, $Zr^{4+}$, $P^5$, etc.) that are tetrahedrally coordinated with respect to oxygen and are members of the anionic part of the melt structure; and "O" is the total number of oxygen gram-ions in the melt.

Natural glasses have different degrees of polymerization. Examples include: silica glass—full polymerization (K=0); obsidian—high polymerization (K ranges between >0 and ~15); andesitic glass—moderate polymerization (K ranges between ~15 and ~40); and basaltic glass—low polymerization (K ranges between ~40 and ~70). E. S. Persikov, *The Viscosity of Magmatic Liquids*, Physical Chemistry of Magmas (Springer-Verlag, 1991), ed. L. L. Perchuk and I. Kushiro, 9, 1-40). For depolymerized glass, K is greater than ~70. A fully polymerized glass such as the albite composition $NaAlSi_3O_8$ has a K of 0, as determined by the calculation K=[2(8−2*4)/4]*100=0. A low polymerized glass such as the glaucophane composition $Na_2Mg_3Al_2(Si_8O_{22})(OH)_2$ has a K of 40, as determined by the calculation K=[2(22−2*10)/10] *100=40.

A highly polymerized glass may be produced in various ways. For example, one can melt natural or synthetic silicates (such as feldspar or plagioclase), or highly polymerized natural glasses (such as obsidian). Or, for example, glass-forming oxides, or chemical precursors of these oxides (such as quartz, borax, lithium nitrates, etc.) in the correct molar ratio of $(R_2O+RO):R_2O_3:(RO_2+R_2O_5)$ also produce highly polymerized glass.

In fact, as mentioned above, the critical determinant responsible for a fully or highly polymerized glass is the $(R_2O+RO):R_2O_3$ part of the ratio, which should be ~1:1. It is preferable that the molar part of $(R_2O+RO)$ is equal to or less than the molar part of $R_2O_3$, because this results in a peraluminous glass. Peraluminous glasses are generally more stable than peralkaline glasses, and therefore peraluminous glasses enable higher waste loadings than peralkaline glasses. However, even peralkaline glasses having the $(R_2O+RO):R_2O_3$ part of the ratio ranging up to 1.3:1 mole parts, will still be highly polymerized, as defined by the Carron equation: $K=NBO/T*100$. For example, $1.3(R_2O+RO):1(R_2O_3):2 (RO_2)$ has a $K=15$, as determined by the calculation $K=[2(8.3-8)/4]*100=15$.

According to the invention, glass formed to immobilize waste should have physical-chemical and structural properties that are as close as possible to those of highly polymerized glass, e.g., a calculated degree of polymerization (K) of less than about 15, and preferably less than about 7. For example, borosilicate glass is used as a matrix for various waste constituents representative of the high-level radioactive waste found at the Hanford Waste Treatment Plant in Richland, Wash. State. Borosilicate glass is the currently accepted immobilization matrix for the future Hanford Waste Treatment Plant.

To test the invention, waste stimulant compositions were used that were similar to those used by Pacific Northwest National Laboratory (PNNL) and Savannah River Site (SRS) in their models of three different Hanford tank sludges: AZ-101, AZ-102 and C-104, as described in Examples 3, 4, and 2, respectively. According to the invention, the molar ratio of $(R_2O+RO):R_2O_3:(RO_2+R_2O_5)$ for the borosilicate glass incorporating these three waste simulants are as follows: AZ-101~1:1.2:4.5; AZ-102~1:1.2:4.2; and C-104~1:1.05:2.3. These ratios are close to the $(R_2O+RO):R_2O_3:(RO_2+R_2O_5)$ molar ratio of a fully polymerized plagioclase glass composition. Using the Carron equation, the calculated K ranges of these three glass compositions are between 3.0 and 6.5, which is within the K range of highly polymerized glass.

Prior art borosilicate glasses incorporating these same three Hanford waste simulants had calculated K ranges within the range of moderately to low polymerized glass. For example, the borosilicate glass developed for the Hanford Waste Treatment Plant tested by SRS (E. K. Hansen et. al., *Mixing Envelope D Sludge with LAW Intermediate Products with and without Glass Formers*, May 2001, Table B-41, p. 115 and Table B-42, p. 117) was used to incorporate AZ-101 and AZ-102 waste simulants, and had $(R_2O+RO):R_2O_3:(RO_2+R_2O_5)$ molar ratios of approximately 2:1:5.7 (AZ-101) and 3.2:1:6.2 (AZ-102). The borosilicate glass formed by PNNL (G. L. Smith et al., Vitrification and Product Testing of C-104 and AZ-102 Pretreated Sludge Mixed with Flowsheet Quantities of Secondary Wastes, February 2001, Table 3.6, pp. 3.10-3.11, and Table 3.9, pp. 3.12-3.13) was used to incorporate C-104 waste simulant, and had an $(R_2O+RO):R_2O_3:(RO_2+R_2O_5)$ molar ratio of approximately 2.5:1:5.8. These SRS and PNNL glass ratios are far from the ratio of fully or highly polymerized glass compositions. Using the Carron equation, the calculated K ranges of these three glass compositions are between 22.5 and 53.6, which is within the K range of moderately to low polymerized glass.

Using the concept of this invention, a 40.8 wt % waste loading was successfully reached using a Hanford C-106 waste simulant (a simulant with a high concentration of iron) as described in Example 1. The 40.8 wt % waste loading that was reached is in contrast to the 25 wt % waste loading currently expected for the Hanford Waste Treatment Plant. The $(R_2O+RO):R_2O_3:(RO_2+R_2O_5)$ molar ratio for the glass of Example 1 is about 1.1:1.17:2, which is the ratio for highly polymerized glass. This glass satisfied all properties required for vitrification in an LCFM melter. The glass composition of Example 1 is suitable to immobilize waste compositions with high amounts of alumina, soda, silica, manganese and iron (high amounts meaning that the total concentration of these components equal more than about 60 to about 70 wt % of the sludge), while at the same time attaining high waste loadings.

Extensive laboratory scale tests have been conducted with high-level waste (HLW) simulants from Hanford and Savannah River. As seen in Table 1 below, experiments were conducted using Hanford batch simulants representative of over 94 volume percent of the Hanford HLW, taken from the *Tanks Focus Area High-Level Waste Melter Study Report, Appendix C—Compositions of* 89 *Waste Batches in Mass Percent of Oxides and Summary Cluster Compositions*. In the experiments, which are described in Examples 5-16, borosilicate glass was produced with waste loadings ranging between 40 and 55 weight percent (up to 15 wt % greater than the maximum expected waste loadings for these wastes). In the experiment described in Example 17, borosilicate glass was produced with a waste loading of 40 weight percent for a Savannah River waste.

In Example 5, Batch 69 was immobilized in borosilicate glass with a 43 wt % waste loading. The main component in Batch 69 is $Na_2O$ (23.36 wt %). In the final glass, the concentration of $Na_2O$ is 10.04 wt %. This $Na_2O$ concentration divided by the concentration of $Na_2O$ in the waste equals 0.43, which means that the estimated waste loading for this waste is 43 wt %.

TABLE 1

Comparison Between DOE's Maximum Expected Waste Loadings For Hanford HLW Using Vitrification,* And GeoMatrix's Laboratory Test Results

| Batch Number | Representative Hanford HLW Cluster | Mass per Cluster of Hanford HLW to be Treated (Tons) | Principal Components of HLW in each Cluster | DOE's Maximum Expected Waste Loading Using Vitrification** (wt %) | GeoMatrix Test Results | | |
|---|---|---|---|---|---|---|---|
| | | | | | Achieved Waste Loading (wt %) | Crystallinity at 1150° C. (vol %) | Crystallinity after 3 days at 950° C. (vol %) |
| 69 | 1 | 2,349 | Al, Na, Si | 35 | 43 | 0 | 0.5 |
| 56 | 2 | 1,749 | Bi, P | 40 | 55 | 0 | 0.2 |
| 35 | 3 | 1,647 | Al, Zr | 35 | 40 | <0.3 | 2*** |
| 46 | 4 | 1,395 | Na, Al, U | 40 | 45 | 0.2 | <1 |
| 53 | 5 | 1,384 | Na, Al, Bi | 40 | 50 | 0 | <0.5 |

TABLE 1-continued

Comparison Between DOE's Maximum Expected Waste Loadings For Hanford
HLW Using Vitrification,* And GeoMatrix's Laboratory Test Results

| | | | | DOE's Maximum | GeoMatrix Test Results | | |
|---|---|---|---|---|---|---|---|
| Batch Number | Representative Hanford HLW Cluster | Mass per Cluster of Hanford HLW to be Treated (Tons) | Principal Components of HLW in each Cluster | Expected Waste Loading Using Vitrification** (wt %) | Achieved Waste Loading (wt %) | Crystallinity at 1150° C. (vol %) | Crystallinity after 3 days at 950° C. (vol %) |
| 62 | 5 | " | " | 40 | 40 | 0 | <1 |
| 87 | 6 | 947 | Na, Al | 40 | 50 | ~0.3 | <0.5 |
| 34 | 7 | 678 | Na, Al | 35 | 50 | 0 | <0.1 |
| 32 | 7 | " | " | 35 | 50 | 0 | <1 |
| 20 | 9 | 426 | Zr | 35 | 40 | <0.3 | 2*** |
| 4 | 11 | 216 | Ag, Fe | 50 | 40 | 0 | <1 |
| 30 | 14 | 150 | Cr, Na | 35 | 40 | 0 | <1 |
| | Total | 11,679 out of 12,385 tons of HLW at Hanford (94%) | | | | | |

*Information taken from TFA HLW Melter Study Report (July 2001), Appendix C and E.
**Maximum Expected Waste Loadings have not yet been reached. Typical waste loadings to date using current Hanford HLW simulants are around 25 wt %.
***Average crystal size <10 um.

In Example 6, Batch 56 was immobilized in borosilicate glass with a 55 wt % waste loading. $Na_2O$ is also the main component of Batch 56 (18.57 wt %). In the final glass, the concentration of $Na_2O$ is 10.2135 wt %. This $Na_2O$ concentration divided by the concentration of $Na_2O$ in the waste equals 0.55, which means that the waste loading for this waste is 55 wt %. Batch 56 has an $(R_2O+RO):R_2O_3:(RO_2+R_2O_5)$ molar ratio of approximately 1:1.14:3.9.

In Example 7, Batch 35 was immobilized in borosilicate glass with a 40 wt % waste loading. $Na_2O$ and $Al_2O_3$ are the main components of Batch 35 (24.87 wt % $Na_2O$ and 27.66 wt % $Al_2O_3$). In the final glass, the concentration of $Na_2O$ is 9.948 wt % and the concentration of $Al_2O_3$ is 11.064 wt %. These $Na_2O$ and $Al_2O_3$ concentrations divided by the $Na_2O$ and $Al_2O_3$ concentrations in the waste equals 0.40, which means that the waste loading for this waste is 40 wt %. Batch 35 has an $(R_2O+RO):R_2O_3:(RO_2+R_2O_5)$ molar ratio of approximately 1:1.18:2.

The waste loadings of the glasses of the remaining examples (Examples 8-17) can be calculated in the same manner.

As noted above, highly polymerized structures may incorporate more ions than low polymerized structures, without subsequent crystallization. Some waste components are incorporated in the glass. Non-incorporated waste components and extra network forming components apparently form other structural units that interact with the fully or highly polymerized structural units. It is assumed that additional structural units are formed during this process, since higher waste loadings are attained than with other glass compositions, without subsequent crystallization. Irrespective of which components of the waste are incorporated in the highly polymerized structures and which form other structural units, according to this invention, the bulk ratio between $(R_2O+RO):R_2O_3:(RO_2+R_2O_5)$ which determines highly polymerized glass, is maintained.

As a result of experimentation, we have determined that the enhanced waste loading characteristics are achieved using the methodology described herein when the glass consists essentially of $(R_2O+RO):R_2O_3:(RO_2+R_2O_5)$ compounds present in a molar ratio of about (1-1.3):(1-1.4):(1.2-4.2), and where $SiO_2$ is present in an amount greater than 30 weight percent, $B_2O_3$ is present in an amount between 8.7 and 15.3 weight percent, $Al_2O_3$ is present in an amount between 7 and 15.1 weight percent, CaO is present in an amount between 0.2 and 2.3 weight percent, and further where fluorine is present in an amount ranging between about 1 and about 3 weight percent. In a preferred embodiment, fluorine is present in an amount between about 1.2 and about 2.5 weight percent.

As is evident from the use of the term "consists essentially" with respect to the compounds present in the glass composition of the present invention, other compounds or substances may be present in the glass. These other compounds or substances, however, must not be present in such an amount that they interfere with the two advantageous characteristics of this glass provided by the described compositions, i.e., its high polymerization and relatively low viscosity. Generally, keeping other compounds or substances to about 10 weight percent or less of the overall glass composition will maintain these advantageous characteristics, although one skilled in the art will understand the full extent of variation possible, and may calculate such variation according to the teachings of the present invention.

Application of the teachings of the present invention to a specific problem or environment is within the capabilities of one having ordinary skill in the art in light of the teachings contained herein. Examples of the products and processes of the present invention appear in the following examples.

Example 1

Vitrifying Hanford C-106 High-Level Waste (HLW) Simulant with 40.8 Weight Percent Waste Loading 1. The C-106 waste composition from Column A was used according to the amounts in Column B. Column C shows the amount (in weight percent) of the components found in the final glass product with a 40.8 weight percent waste loading.

| A Oxides | B Waste (wt %) | C 40.8% Waste (wt %) | D Additives (wt %) | E Final Glass (wt %) |
|---|---|---|---|---|
| $Al_2O_3$ | 12.77 | 5.208883 | 1.791117 | 7 |
| $B_2O_3$ | 0.49 | 0.199871 | 8.500129 | 8.7 |
| CaO | 1.09 | 0.444611 | 0 | 0.4446 |
| Cl | 0.39 | 0.159081 | 0 | 0 |
| $Cr_2O_3$ | 0.28 | 0.114212 | 0 | 0.1142 |
| $Cs_2O$ | 0.18 | 0.073422 | 0 | 0.0734 |
| $Cu_2O$ | 0.16 | 0.065264 | 0 | 0.06526 |

-continued

| A Oxides | B Waste (wt %) | C 40.8% Waste (wt %) | D Additives (wt %) | E Final Glass (wt %) |
|---|---|---|---|---|
| F | 0.39 | 0.159081 | 0 | 0 |
| $Fe_2O_3$ | 45.35 | 18.49827 | 0 | 18.5 |
| I | 0.87 | 0.354873 | 0 | 0.3548 |
| $K_2O$ | 0.49 | 0.199871 | 8.500129 | 8.7 |
| $La_2O_3$ | 4.21 | 1.717259 | 0 | 1.7172 |
| $Li_2O$ | 1.09 | 0.444611 | 0 | 0.4446 |
| MgO | 14.41 | 5.877839 | 0 | 5.8778 |
| MnO | 2.11 | 0.860669 | 12.13933 | 13 |
| $Na_2O$ | 0.54 | 0.220266 | 0 | 0.2203 |
| $Nd_2O_3$ | 0.62 | 0.252898 | 0 | 0.2528 |
| NiO | 0.34 | 0.138686 | 0.861314 | 1 |
| $P_2O_5$ | 0.52 | 0.212108 | 0 | 0.2121 |
| PbO | 7.35 | 2.998065 | 31.00194 | 34 |
| $Sb_2O_3$ | 3.31 | 1.350149 | 0 | 1.3501 |
| $SeO_2$ | 0.51 | 0.208029 | 0.791971 | 1 |
| $SiO_2$ | 0.25 | 0.101975 | 0 | 0.1019 |
| $SrO_2$ | 0.97 | 0.395663 | 0.604337 | 1 |
| $TiO_2$ | 0 | 0 | 2 | 2 |
| ZnO | 0 | 0 | 3.8 | 3.8 |
| $ZrO_2$ | 12.77 | 5.208883 | 1.791117 | 7 |

2. Glass-forming components according to the amounts in Column D were added to the C-106 waste composition, producing the final glass composition shown in Column E. The exact amounts of glass-forming components used were calculated together with the C-106 waste components, so that the total amount of the components would achieve a molar ratio of $(R_2O+RO):R_2O_3:(RO_2+R_2O_5)$ within the range of about (1-1.3):(1-1.4):(1.2-4.2). The molar ratio achieved was approximately 1.1:1.17:2.

3. The mixture of step 1 and step 2 was stirred together for 1 hour at ambient temperature, producing an aqueous suspension.

4. The product of step 3 was then melted at 1150° C. for 5 hours in a muffle furnace, and then quenched.

5. The resultant glass was then tested to determine the suitability of this composition for processing using liquid-fed ceramic melter (LFCM) technology. The results of six tests demonstrated that the composition was suitable for processing using LFCM technology:
  (a) Crystallinity after being quenched: No crystals were found.
  (b) Crystallinity after 3 days at 950° C.: <1 vol % crystals (spinel) were found.
  (c) Viscosity: Ranges from 3.04 Pascal second at 1200° C. to 69.8 Pascal second at 950° C.
  (d) Specific electrical resistivity: Ranges from 6.14 Ωcm at 1200° C. to 16.29 Ωcm at 950° C.
  (e) Product Consistency Test (PCT) results ($g/m^2/d$): Li—$2.34\times10^{-2}$; Na—$1.78\times10^{-2}$; B—$1.04\times10^{-2}$; Al—$8.57\times10^{-3}$; Si—$4.94\times10^{-3}$.
  (f) Toxicity Characteristic Leaching Procedure (TCLP) results (mg/L): Ni—0.18; Sb—0.10; As—0.019; Cr—0.05; Se—0.10; Zn—0.17.

Example 2

Vitrifying Hanford C-104 High-Level Waste (HLW) Simulant with 45 Weight Percent Waste Loading 1. The C-104 waste composition from Column A was used according to the amounts in Column B. Column C shows the amount (in weight percent) of the components found in the final glass product with a 45 weight percent waste loading.

| A Oxides | B Waste (wt %) | C 45% Waste (wt %) | D Additives (wt %) | E Final Glass (wt %) |
|---|---|---|---|---|
| $Al_2O_3$ | 8.723 | 3.92535 | 5.1432 | 9.06855 |
| $B_2O_3$ | 0.021 | 0.00945 | 9.25555 | 9.265 |
| CaO | 1.505 | 0.67725 | 0 | 0.67725 |
| CdO | 0.24 | 0.108 | 0 | 0.108 |
| $Ce_2O_3$ | 0.275 | 0.12375 | 0 | 0.12375 |
| Cl | 0 | 0 | 0.0045 | 0.0045 |
| $Cr_2O_3$ | 0.359 | 0.16155 | 0 | 0.16155 |
| $Cs_2O$ | 0.027 | 0.01215 | 0 | 0.01215 |
| $Cu_2O$ | 0.073 | 0.03285 | 0.00315 | 0.036 |
| $Fe_2O_3$ | 16.013 | 7.20585 | 1.2965 | 8.50235 |
| F | 0 | 0 | 1.243 | 1.243 |
| $K_2O$ | 0.076 | 0.0342 | 0 | 0.0342 |
| $La_2O_3$ | 0.43 | 0.1935 | 0 | 0.1935 |
| $Li_2O$ | 0 | 0 | 1.243 | 1.243 |
| MgO | 0.222 | 0.0999 | 1.7751 | 1.875 |
| MnO | 3.195 | 1.43775 | 0.48825 | 1.926 |
| $Na_2O$ | 9.925 | 4.46625 | 2.96875 | 7.435 |
| $Nd_2O_3$ | 0.082 | 0.0369 | 0.0621 | 0.099 |
| NiO | 0.907 | 0.40815 | 0.15885 | 0.567 |
| $P_2O_5$ | 1.237 | 0.55665 | 0 | 0.55665 |
| PbO | 0.4 | 0.18 | 0 | 0.18 |
| $Sb_2O_3$ | 0 | 0 | 0 | 0 |
| $SeO_2$ | 0 | 0 | 0 | 0 |
| $SiO_2$ | 0.906 | 0.4077 | 35.7643 | 36.172 |
| $SrO_2$ | 0.28 | 0.126 | 0 | 0.126 |
| $TiO_2$ | 0.063 | 0.02835 | 0 | 0.02835 |
| ZnO | 0.128 | 0.0576 | 0 | 0.0576 |
| $ZrO_2$ | 19.075 | 8.58375 | 2.86825 | 11.452 |

2. Glass-forming components according to the amounts in Column D were added to the C-104 waste composition, producing the final glass composition shown in Column E. The exact amounts of glass-forming components used were calculated together with the C-104 waste components, so that the total amount of the components would achieve a molar ratio of $(R_2O+RO):R_2O_3:(RO_2+R_2O_5)$ within the range of about (1-1.3):(1-1.4):(1.2-4.2). The molar ratio achieved was approximately 1:1.05:2.3. Zeolite (a natural silicate) was added as a source of part of the glass-forming components.

3. The mixture of step 1 and step 2 were stirred together for 1 hour at ambient temperature, producing an aqueous suspension.

4. The product of step 3 was then melted at 1150° C. for 5 hours in a muffle furnace, and then quenched.

5. The resultant glass was then tested to determine the suitability of this composition for processing using liquid-fed ceramic melter (LFCM) technology. The results of six tests demonstrated that the composition was suitable for processing using LFCM technology:
  (a) Crystallinity after being quenched: <1 vol % crystals (zircon) were found.
  (b) Crystallinity after 3 days at 950° C.: <2 vol % crystals (zircon) were found.
  (c) Viscosity: Ranges from 4.10 Pascal second at 1200° C. to 91.0 Pascal second at 950° C.
  (d) Specific electrical resistivity: Ranges from 3.39 Ωcm at 1200° C. to 9.10 cm at 95° C.
  (e) PCT results ($g/m^2/d$): Li—$7.9\times10^{-4}$; Na—$5.3\times10^{-2}$; B—$5.7\times10^{-3}$; Si—$6.1\times10^{-3}$.
  (f) TCLP results (mg/L): Ni—0.033; Cr—0.011; Zn—0.19; Pb—0.077.

Example 3

Vitrifying Hanford AZ-101 High-Level Waste (HLW) Simulant with 45 Weight Percent Waste Loading 1. The waste composition from Column A was used according to the amounts in Column B. Column C shows the amount (in weight percent) of the components found in the final glass product with a 45 weight percent waste loading.

| A<br>Oxides | B<br>Waste<br>(wt %) | C<br>45% Waste<br>(wt %) | D<br>Additives<br>(wt %) | E<br>Final Glass<br>(wt %) |
|---|---|---|---|---|
| $Ag_2O$ | 0.26 | 0.117 | 0 | 0.117 |
| $Al_2O_3$ | 11.63 | 5.2335 | 3.7665 | 9 |
| $B_2O_3$ | 0 | 0 | 11 | 11 |
| BaO | 0.25 | 0.1125 | 0 | 0.1125 |
| CaO | 1.34 | 0.603 | 0.597 | 1.2 |
| CdO | 2.71 | 1.2195 | 0 | 1.2195 |
| $CeO_2$ | 0.37 | 0.1665 | 0 | 0.1665 |
| CoO | 0.39 | 0.1755 | 0 | 0.1755 |
| $Cr_2O_3$ | 0.35 | 0.1575 | 0 | 0.1575 |
| CuO | 0.13 | 0.0585 | 0 | 0.0585 |
| F | 0 | 0 | 2 | 2 |
| $Fe_2O_3$ | 43.31 | 19.4895 | 0.2805 | 19.77 |
| $K_2O$ | 1.23 | 0.5535 | 0 | 0.5535 |
| $La_2O_3$ | 1.44 | 0.648 | 0 | 0.648 |
| $Li_2O$ | 0 | 0 | 3.5 | 3.5 |
| MgO | 0.28 | 0.126 | 0 | 0.126 |
| MnO | 0.91 | 0.4095 | 8.5905 | 9 |
| $Na_2O$ | 0.02 | 0.009 | 0 | 0.009 |
| $Nd_2O_3$ | 0.95 | 0.4275 | 0 | 0.4275 |
| NiO | 2.37 | 1.0665 | 0 | 1.0665 |
| $P_2O_5$ | 2.54 | 1.143 | 0 | 1.143 |
| PbO | 0.37 | 0.1665 | 0 | 0.1665 |
| $SiO_2$ | 3.2 | 1.44 | 30.56 | 32 |
| SrO | 0.19 | 0.0855 | 0 | 0.0855 |
| $TiO_2$ | 0.05 | 0.0225 | 0 | 0.0225 |
| ZnO | 0.11 | 0.0495 | 0 | 0.0495 |
| $ZrO_2$ | 13.69 | 6.1605 | 0 | 6.1605 |

2. Glass-forming components according to the amounts in Column D were added to the waste composition, producing the final glass composition shown in Column E. The exact amounts of glass-forming components used were calculated together with the AZ-101 waste components, so that the total amount of the components would achieve a molar ratio of $(R_2O+RO):R_2O_3:(RO_2+R_2O_5)$ within the range (1-1.3):(1-1.4):(1.2-4.2). The molar ratio achieved was approximately 1:1.2:4.5. Zeolite (a natural silicate) was added as a source of part of the glass-forming components.

3. The mixture of step 1 and step 2 were stirred together for 1 hour at ambient temperature, producing an aqueous suspension.

4. The product of step 3 was then melted at 1150° C. for 5 hours in a muffle furnace, and then quenched.

5. The resultant glass was then tested to determine the suitability of this composition for processing using liquid-fed ceramic melter (LFCM) technology. The results of six tests demonstrated that the composition was suitable for processing using LFCM technology:

(a) Crystallinity after being quenched: No crystals were found.

(b) Crystallinity after 3 days at 950° C.: <1 vol % crystals (spinel) were found (c) Viscosity: Ranges from 2.5 Pascal second at 1200° C. to 46.5 Pascal second at 950° C.

(d) Specific electrical resistivity: Ranges from 2.91 Ωcm at 1200° C. to 8.65 Ωcm at 950° C.

(e) PCT results (g/m²/d): Li—$8.0 \times 10^{-4}$; Na—$1.3 \times 10^{-3}$; B—$4.55 \times 10^{-3}$; Si—$8.0 \times 10^{-2}$.

(f) TCLP results (mg/L): Ni—0.052; Cr—0.05; Pb—1.1; Ba—3.0; Ag—0.32; Cd—1.1.

Example 4

Vitrifying Hanford AZ-102 High-Level Waste (HLW) Simulant with 45 Weight Percent Waste Loading 1. The waste composition from Column A was used according to the amounts in Column B. Column C shows the amount (in weight percent) of the components found in the final glass product with a 45 weight percent waste loading

| A<br>Oxides | B<br>Waste<br>(wt %) | C<br>45% Waste<br>(wt %) | D<br>Additives<br>(wt %) | E<br>Final Glass<br>(wt %) |
|---|---|---|---|---|
| $Al_2O_3$ | 26.28 | 11.826 | 2.964 | 14.7901 |
| $B_2O_3$ | 0 | 0 | 8.72 | 8.72 |
| CaO | 0.18 | 0.081 | 0.949 | 1.03 |
| CdO | 4.77 | 2.1465 | 0 | 2.1465 |
| $Cs_2O$ | 0 | 0 | 0.0945 | 0.0945 |
| F | 0 | 0 | 1.225 | 1.225 |
| $Fe_2O_3$ | 40.99 | 18.4455 | 1.3456 | 19.7911 |
| I | 0.42 | 0.189 | 0 | 0.189 |
| $K_2O$ | 0 | 0 | 1.058 | 1.058 |
| $La_2O_3$ | 1.08 | 0.486 | 0.2115 | 0.6975 |
| $Li_2O$ | 0 | 0 | 3.33 | 3.33 |
| MgO | 0.42 | 0.189 | 0 | 0.189 |
| MnO | 0.9 | 0.405 | 0.2565 | 0.6615 |
| $Na_2O$ | 13.16 | 5.922 | 0.89 | 6.812 |
| $Nd_2O_3$ | 0.04 | 0.018 | 0.288 | 0.306 |
| NiO | 2.68 | 1.206 | 0 | 1.206 |
| PbO | 0.01 | 0.0045 | 0.126 | 0.1305 |
| $P_2O_3$ | 0.83 | 0.3735 | 0 | 0.3735 |
| $SiO_2$ | 1.97 | 0.8865 | 34.7453 | 35.6318 |
| $SO_3$ | 0 | 0 | 0.0765 | 0.0765 |
| ZnO | 0.15 | 0.0675 | 0 | 0.0675 |
| $ZrO_2$ | 5.73 | 2.5785 | 0.702 | 3.2805 |

2. Glass-forming components according to the amounts in Column D were added to the waste composition, producing the final glass composition shown in Column E. The exact amounts of glass-forming components used were calculated together with the AZ-102 waste components, so that the total amount of the components would achieve a molar ratio of $(R_2O+RO):R_2O_3:(RO_2+R_2O_5)$ within the range of about (1-1.3):(1-1.4):(1.2-4.2). The molar ratio achieved was approximately 1:1.2:4.2. Zeolite (a natural silicate) was added as a source of part of the glass-forming components.

3. The mixture of step 1 and step 2 were stirred together for 1 hour at ambient temperature, producing an aqueous suspension.

4. The product of step 3 was then melted at 1150° C. for 5 hours in a muffle furnace, and then quenched.

5. The resultant glass was then tested to determine the suitability of this composition for processing using liquid-fed ceramic melter (LFCM) technology. The results of six tests demonstrated that the composition was suitable for processing using LFCM technology:

(a) Crystallinity after being quenched: No crystals were found.

(b) Crystallinity after 3 days at 950° C.: <1 vol % crystals (spinel) were found.

(c) Viscosity: Ranges from 4.66 Pascal second at 1200° C. to 47.9 Pascal second at 950° C.

(d) Specific electrical resistivity: Ranges from 4.92 Ωcm at 1200° C. to 10.7 Ωcm at 950° C.

(e) PCT results (g/m²/d): Li—$1.4 \times 10^{-3}$; Na—$6.2 \times 0^{-2}$; B—$7.2 \times 10^{-3}$; Si—$1.2 \times 10^{-2}$.

(f) TCLP results (mg/L): Ni—0.01; Cr—0.01; Ba—0.507; Pb—0.05; Ag—0.05; Cd—0.54.

Example 5

Vitrifying Batch 69 Hanford High-Level Waste (HLW) Simulant with 43 Weight Percent Waste Loading 1. The waste composition from Column A was used according to the amounts in Column B. Column C shows the amount (in weight percent) of the components found in the final glass product with a 43 weight percent waste loading.

| A Oxides | B Waste (wt %) | C 43% Waste (wt %) | D Additives (wt %) | E Final Glass (wt %) |
|---|---|---|---|---|
| $Al_2O_3$ | 18.86 | 8.1098 | 3.8902 | 12 |
| $B_2O_3$ | 0 | 0 | 15 | 15 |
| $Bi_2O_3$ | 4.8 | 2.064 | 0 | 2.064 |
| CaO | 4.58 | 1.9694 | 1.0306 | 3 |
| $Cr_2O_3$ | 0.54 | 0.2322 | 0 | 0.2322 |
| F | 0.76 | 0.3268 | 1.6732 | 2 |
| $Fe_2O_3$ | 10.48 | 4.5064 | 5.4936 | 10 |
| $K_2O$ | 0.12 | 0.0516 | 0.9484 | 1 |
| $Li_2O$ | 0 | 0 | 4 | 4 |
| MnO | 1.08 | 0.4644 | 0 | 0.4644 |
| $Na_2O$ | 23.36 | 10.0448 | 0 | 10.0448 |
| NiO | 0.96 | 0.4128 | 0 | 0.4128 |
| $P_2O_5$ | 2.74 | 1.1782 | 0 | 1.1782 |
| PbO | 0.32 | 0.1376 | 0 | 0.1376 |
| $SiO_2$ | 23.26 | 10.0018 | 24.9982 | 35 |
| $SO_3$ | 0.12 | 0.0516 | 0 | 0.0516 |
| SrO | 0.79 | 0.3397 | 0 | 0.3397 |
| $U_3O_8$ | 6.86 | 2.9498 | 0 | 2.9498 |
| ZrO | 0.11 | 0.0473 | 0 | 0.0473 |

2. Glass-forming components according to the amounts in Column D were added to the waste composition, producing the final glass composition shown in Column E. The exact amounts of glass-forming components used were calculated together with the Batch 69 waste components, so that the total amount of the components would achieve a molar ratio of $(R_2O+RO):R_2O_3:(RO_2+R_2O_5)$ within the range of about (1-1.3):(1-1.4):(1.2-4.2).

3. The mixture of step 1 and step 2 were stirred together for 1 hour at ambient temperature, producing an aqueous suspension.

4. The product of step 3 was then melted at 1150° C. for 5 hours in a muffle furnace, and then quenched.

5. The resultant glass was then tested to determine the suitability of this composition for processing using liquid-fed ceramic melter (LFCM) technology. The results demonstrated that the composition was suitable for processing using LFCM technology:

(a) Crystallinity after being quenched: No crystals were found.
   (b) Crystallinity after 3 days at 950° C.: <0.5 vol % crystals (spinel) were found.
   (c) TCLP results (mg/L): Ni —0.12; Cr —0.024; Pb —0.04.

Viscosity, specific electrical resistivity, and PCT were not measured. Due to the similarity of this glass composition to the C-106 composition, the results were expected to be similar.

Example 6

Vitrifying Batch 56 Hanford High-Level Waste (HLW) Simulant with 55 Weight Percent Waste Loading 1. The Batch 56 waste composition from Column A was used according to the amounts in Column B. Column C shows the amount (in weight percent) of the components found in the final glass product with a 55 weight percent waste loading.

| A Oxides | B Waste (wt %) | C 55% Waste (wt %) | D Additives (wt %) | E Final Glass (wt %) |
|---|---|---|---|---|
| $Al_2O_3$ | 15.47 | 8.5085 | 1.23476 | 9.74326 |
| $B_2O_3$ | 0.15 | 0.0825 | 15.1807 | 15.2632 |
| BaO | 0.65 | 0.3575 | 0 | 0.3575 |
| $Bi_2O_3$ | 9.03 | 4.9665 | 0 | 4.9665 |
| CaO | 4.11 | 2.2605 | 0 | 2.2605 |
| CdO | 0.06 | 0.033 | 0 | 0.033 |
| $Ce_2O_3$ | 0.05 | 0.0275 | 0 | 0.0275 |
| Cl | 0 | 0 | 0.1482 | 0.1482 |
| $Cr_2O_3$ | 1.26 | 0.693 | 0 | 0.693 |
| $Cs_2O$ | 0 | 0 | 0.0684 | 0.0684 |
| CuO | 0.11 | 0.0605 | 0.0003 | 0.0608 |
| F | 1.18 | 0.649 | 0.636 | 1.285 |
| $Fe_2O_3$ | 21.88 | 12.034 | 5.539 | 17.573 |
| $K_2O$ | 0.38 | 0.209 | 0.6671 | 0.8761 |
| $La_2O_3$ | 1.03 | 0.5665 | 0 | 0.5665 |
| $Li_2O$ | 0 | 0 | 1.842 | 1.842 |
| MgO | 1.33 | 0.7315 | 1.0825 | 1.814 |
| MnO | 2.76 | 1.518 | 3.9578 | 5.4758 |
| $Na_2O$ | 18.57 | 10.2135 | 0 | 10.2135 |
| $Nd_2O_3$ | 0 | 0 | 0.2052 | 0.2052 |
| NiO | 1.18 | 0.649 | 0 | 0.649 |
| $P_2O_5$ | 3.85 | 2.1175 | 0 | 2.1175 |
| PbO | 0.73 | 0.4015 | 0 | 0.4015 |
| $SiO_2$ | 8.75 | 4.8125 | 26.0494 | 30.8619 |
| SrO | 0.16 | 0.088 | 1.1698 | 1.2578 |
| $ThO_2$ | 0.05 | 0.0275 | 0 | 0.0275 |
| $TiO_2$ | 0 | 0 | 0.1938 | 0.1938 |
| $U_3O_8$ | 4.94 | 2.717 | 0 | 2.717 |
| ZnO | 0.07 | 0.0385 | 0.0565 | 0.095 |
| $ZrO_2$ | 1.73 | 0.9515 | 0 | 0.9515 |

2. Glass-forming components according to the amounts in Column D were added to the waste composition, producing the final glass composition shown in Column E. The exact amounts of glass-forming components used were calculated together with the Batch 56 waste components, so that the total amount of the components would achieve a molar ratio of $(R_2O+RO):R_2O_3:(RO_2+R_2O_5)$ within the range of about (1-1.3):(1-1.4):(1.2-4.2). The molar ratio achieved was approximately 1:1.14:3.9.

3. The mixture of step 1 and step 2 were stirred together for 1 hour at ambient temperature, producing an aqueous suspension.

4. The product of step 3 was then melted at 1150° C. for 5 hours in a muffle furnace, and then quenched.

5. The resultant glass was then tested to determine the suitability of this composition for processing using liquid-fed ceramic melter (LFCM) technology. The results demonstrated that the composition was suitable for processing using LFCM technology:

(a) Crystallinity after being quenched: No crystals were found.
   (b) Crystallinity after 3 days at 950° C.: <0.2 vol % crystals (spinel) were found.

Viscosity, specific electrical resistivity, PCT and TCLP were not verified. Due to the similarity of the major glass components of this glass to those of C-106, the results were expected to be similar.

Example 7

Vitrifying Batch 35 Hanford High-Level Waste (HLW) Simulant with 40 Weight Percent Waste Loading 1. The Batch 35 waste composition from Column A was used according to the amounts in Column B. Column C shows the amount (in weight percent) of the components found in the final glass product with a 40 weight percent waste loading.

2. Glass-forming components according to the amounts in Column D were added to the waste composition, producing the final glass composition shown in Column E. The exact amounts of glass-forming components used were calculated together with the Batch 35 waste components, so that the total amount of the components would achieve a molar ratio of $(R_2O+RO):R_2O_3:(RO_2+R_2O_5)$ within the range of about (1-1.3):(1-1.4):(1.2-4.2). The molar ratio achieved was approximately 1:1.18:2.

| A Oxides | B Waste (wt %) | C 40% Waste (wt %) | D Additives (wt %) | E Final Glass (wt %) |
|---|---|---|---|---|
| $Al_2O_3$ | 27.66 | 11.064 | 0 | 11.064 |
| $B_2O_3$ | 0.71 | 0.284 | 14.976 | 15.26 |
| $Bi_2O_3$ | 0.23 | 0.092 | 0 | 0.092 |
| CaO | 1.49 | 0.596 | 0.434 | 1.03 |
| $Cr_2O_3$ | 2.42 | 0.968 | 0 | 0.968 |
| F | 2.13 | 0.852 | 0.428 | 1.28 |
| $Fe_2O_3$ | 5.66 | 2.264 | 7.736 | 10 |
| $K_2O$ | 1.23 | 0.492 | 0.378 | 0.87 |
| $Li_2O$ | 0.22 | 0.088 | 1.752 | 1.84 |
| MgO | 0.06 | 0.024 | 1.786 | 1.81 |
| MnO | 1.29 | 0.516 | 4.954 | 5.47 |
| $Na_2O$ | 24.87 | 9.948 | 0 | 9.948 |
| NiO | 0.91 | 0.364 | 0 | 0.364 |
| $P_2O_5$ | 1.48 | 0.592 | 0 | 0.592 |
| PbO | 0.4 | 0.16 | 0.03 | 0.19 |
| $SiO_2$ | 6.82 | 2.728 | 28.132 | 30.86 |
| SrO | 0.19 | 0.076 | 1.184 | 1.26 |
| $ThO_2$ | 0.37 | 0.148 | 0 | 0.148 |
| $U_3O_8$ | 10.07 | 4.028 | 0 | 4.028 |
| $ZrO_2$ | 11.25 | 4.5 | 0 | 4.5 |

3. The mixture of step 1 and step 2 were stirred together for 1 hour at ambient temperature, producing an aqueous suspension.

4. The product of step 3 was then melted at 1150° C. for 5 hours in a muffle furnace, and then quenched.

5. The resultant glass was then tested to determine the suitability of this composition for processing using liquid-fed ceramic melter (LFCM) technology. The results demonstrated that the composition was suitable for processing using LFCM technology:
  (a) Crystallinity after being quenched: <0.3 vol % (spinel) crystals were found.
  (b) Crystallinity after 3 days at 950° C.: 2 vol % crystals (spinel) were found. Average size <10 microns.

Viscosity, specific electrical resistivity, PCT and TCLP were not verified. Due to the similarity of the major glass components of this glass to those of C-106, the results were expected to be similar.

Example 8

Vitrifying Batch 46 Hanford High-Level Waste (HLW) Simulant with 45 Weight Percent Waste Loading 1. The Batch 46 waste composition from Column A was used according to the amounts in Column B. Column C shows the amount (in weight percent) of the components found in the final glass product with a 45 weight percent waste loading.

2. Glass-forming components according to the amounts in Column D were added to the waste composition, producing the final glass composition shown in Column E. The exact amounts of glass-forming components used were calculated together with the Batch 46 waste components, so that the total amount of the components would achieve a molar ratio of $(R_2O+RO):R_2O_3:(RO_2+R_2O_5)$ within the range of about (1-1.3):(1-1.4):(1.2-4.2). The molar ratio achieved was approximately 1:1.11:2.

| A Oxides | B Waste (wt %) | C 45% Waste (wt %) | D Additives (wt %) | E Final Glass (wt %) |
|---|---|---|---|---|
| $Al_2O_3$ | 18.11 | 8.1495 | 6.2505 | 14.4 |
| $B_2O_3$ | 0.28 | 0.126 | 14.874 | 15 |
| $Bi_2O_3$ | 2.09 | 0.9405 | 0 | 0.9405 |
| CaO | 5.07 | 2.2815 | 0.0005 | 2.282 |
| $Cr_2O_3$ | 1.29 | 0.5805 | 0 | 0.5805 |
| F | 3.08 | 1.386 | 0 | 1.386 |
| $Fe_2O_3$ | 12.27 | 5.5215 | 0 | 5.5215 |
| $K_2O$ | 0.35 | 0.1575 | 0 | 0.1575 |
| $Li_2O$ | 0.03 | 0.0135 | 1.8265 | 1.84 |
| MgO | 0.28 | 0.126 | 0 | 0.126 |
| MnO | 1.95 | 0.8775 | 0 | 0.8775 |
| $Na_2O$ | 24.16 | 10.872 | 0 | 10.872 |
| NiO | 3.1 | 1.395 | 0 | 1.395 |
| $P_2O_5$ | 5.02 | 2.259 | 0 | 2.259 |
| PbO | 0.62 | 0.279 | 0 | 0.279 |
| $SiO_2$ | 5.92 | 2.664 | 32.336 | 35 |
| SrO | 1.87 | 0.8415 | 0 | 0.8415 |
| $ThO_2$ | 0.3 | 0.135 | 0 | 0.135 |
| $U_3O_8$ | 12.03 | 5.4135 | 0 | 5.4135 |
| $ZrO_2$ | 0.93 | 0.4185 | 0 | 0.4185 |

3. The mixture of step 1 and step 2 were stirred together for 1 hour at ambient temperature, producing an aqueous suspension.

4. The product of step 3 was then melted at 1150° C. for 5 hours in a muffle furnace, and then quenched.

5. The resultant glass was then tested to determine the suitability of this composition for processing using liquid-fed ceramic melter (LFCM) technology. The results demonstrated that the composition was suitable for processing using LFCM technology:
  (a) Crystallinity after being quenched: 0.2 vol % (spinel) crystals were found.
  (b) Crystallinity after 3 days at 950° C.: <1 vol % crystals (spinel) were found.

Viscosity, specific electrical resistivity, PCT and TCLP were not verified. Due to the similarity of the major glass components of this glass to those of C-106, the results were expected to be similar.

Example 9

Vitrifying Batch 53 Hanford High-Level Waste (HLW) Simulant with 50 Weight Percent Waste Loading 1. The Batch 53 waste composition from Column A was used according to the amounts in Column B. Column C shows the amount (in weight percent) of the components found in the final glass product with a 50 weight percent waste loading.

| A Oxides | B Waste (wt %) | C 50% Waste (wt %) | D Additives (wt %) | E Final Glass (wt %) |
|---|---|---|---|---|
| $Al_2O_3$ | 16.42 | 8.21 | 1.53 | 9.74 |
| $B_2O_3$ | 0.07 | 0.035 | 13.965 | 14 |
| $Bi_2O_3$ | 10.63 | 5.315 | 0 | 5.315 |
| CaO | 3.62 | 1.81 | 0 | 1.81 |

-continued

| A Oxides | B Waste (wt %) | C 50% Waste (wt %) | D Additives (wt %) | E Final Glass (wt %) |
|---|---|---|---|---|
| $Cr_2O_3$ | 0.73 | 0.365 | 0 | 0.365 |
| F | 5.09 | 2.545 | 0 | 2.545 |
| $Fe_2O_3$ | 14.99 | 7.495 | 2.505 | 10 |
| $K_2O$ | 0.15 | 0.075 | 0.795 | 0.87 |
| $Li_2O$ | 0.01 | 0.005 | 1.835 | 1.84 |
| MgO | 0.11 | 0.055 | 1.745 | 1.8 |
| MnO | 0.58 | 0.29 | 1.58 | 1.87 |
| $Na_2O$ | 19.93 | 9.965 | 0 | 9.965 |
| NiO | 1.01 | 0.505 | 0 | 0.505 |
| $P_2O_5$ | 4.77 | 2.385 | 0 | 2.385 |
| PbO | 0.66 | 0.33 | 0 | 0.33 |
| $SiO_2$ | 9.18 | 4.59 | 26.27 | 30.86 |
| SrO | 0.52 | 0.26 | 0 | 0.26 |
| $ThO_2$ | 0.06 | 0.03 | 0 | 0.03 |
| $U_3O_8$ | 10.88 | 5.44 | 0 | 5.44 |
| $ZrO_2$ | 0.18 | 0.09 | 0.01 | 0.1 |

2. Glass-forming components according to the amounts in Column D were added to the waste composition, producing the final glass composition shown in Column E. The exact amounts of glass-forming components used were calculated together with the Batch 53 waste components, so that the total amount of the components would achieve a molar ratio of $(R_2O+RO):R_2O_3:(RO_2+R_2O_5)$ within the range of about (1-1.3):(1-1.4):(1.2-4.2). The molar ratio achieved was approximately 1.1:1:2.

3. The mixture of step 1 and step 2 were stirred together for 1 hour at ambient temperature, producing an aqueous suspension.

4. The product of step 3 was then melted at 1150° C. for 5 hours in a muffle furnace, and then quenched.

5. The resultant glass was then tested to determine the suitability of this composition for processing using liquid-fed ceramic melter (LFCM) technology. The results demonstrated that the composition was suitable for processing using LFCM technology:

(a) Crystallinity after being quenched: No crystals were found.
   (b) Crystallinity after 3 days at 950° C.: <0.5 vol % crystals (spinel) were found.

Viscosity, specific electrical resistivity, PCT and TCLP were not verified. Due to the similarity of the major glass components of this glass to those of C-106, the results were expected to be similar.

Example 10

Vitrifying Batch 62 Hanford High-Level Waste (HLW) Simulant with 40 Weight Percent Waste Loading 1. The Batch 62 waste composition from Column A was used according to the amounts in Column B. Column C shows the amount (in weight percent) of the components found in the final glass product with a 40 weight percent waste loading.

| A Oxides | B Waste (wt %) | C 40% Waste (wt %) | D Additives (wt %) | E Final Glass (wt %) |
|---|---|---|---|---|
| $Al_2O_3$ | 14.84 | 5.936 | 3.804 | 9.74 |
| $B_2O_3$ | 0.34 | 0.136 | 14.864 | 15 |
| $Bi_2O_3$ | 0.02 | 0.008 | 0 | 0.008 |
| CaO | 0.86 | 0.344 | 0.686 | 1.03 |
| CdO | 2.91 | 1.164 | 0 | 1.164 |
| $Cr_2O_3$ | 0.06 | 0.024 | 0 | 0.024 |
| F | 0.56 | 0.224 | 1.056 | 1.28 |
| $Fe_2O_3$ | 42.85 | 17.14 | 0 | 17.14 |
| $K_2O$ | 0.98 | 0.392 | 0.478 | 0.87 |
| $La_2O_3$ | 1.56 | 0.624 | 0 | 0.624 |
| $Li_2O$ | 0.05 | 0.02 | 1.82 | 1.84 |
| MgO | 0.4 | 0.16 | 0 | 0.16 |
| MnO | 0.52 | 0.208 | 0 | 0.208 |
| $Na_2O$ | 11.45 | 4.58 | 5 | 9.58 |
| NiO | 2.35 | 0.94 | 0 | 0.94 |
| $P_2O_5$ | 0.03 | 0.012 | 0 | 0.012 |
| PbO | 0.13 | 0.052 | 0 | 0.052 |
| $SiO_2$ | 0.21 | 0.084 | 33.252 | 33.336 |
| SrO | 0.12 | 0.048 | 0 | 0.048 |
| $ThO_2$ | 0.23 | 0.092 | 0 | 0.092 |
| $U_3O_8$ | 2.61 | 1.044 | 0 | 1.044 |
| $ZrO_2$ | 14.52 | 5.808 | 0 | 5.808 |

2. Glass-forming components according to the amounts in Column D were added to the waste composition, producing the final glass composition shown in Column E. The exact amounts of glass-forming components used were calculated together with the Batch 62 waste components, so that the total amount of the components would achieve a molar ratio of $(R_2O+RO):R_2O_3:(RO_2+R_2O_5)$ within the range of about (1-1.3):(1-1.4):(1.2-4.2). The molar ratio achieved was approximately 1:1.38:2.

3. The mixture of step 1 and step 2 were stirred together for 1 hour at ambient temperature, producing an aqueous suspension.

4. The product of step 3 was then melted at 1150° C. for 5 hours in a muffle furnace, and then quenched.

5. The resultant glass was then tested to determine the suitability of this composition for processing using liquid-fed ceramic melter (LFCM) technology. The results demonstrated that the composition was suitable for processing using LFCM technology:

(a) Crystallinity after being quenched: No crystals were found.
   (b) Crystallinity after 3 days at 950° C.: <1 vol % crystals (spinel) were found.

Viscosity, specific electrical resistivity, PCT and TCLP were not verified. Due to the similarity of the major glass components of this glass to those of C-106, the results were expected to be similar.

Example 11

Vitrifying Batch 87 Hanford High-Level Waste (HLW) Simulant with 50 Weight Percent Waste Loading 1. The Batch 87 waste composition from Column A was used according to the amounts in Column B. Column C shows the amount (in weight percent) of the components found in the final glass product with a 50 weight percent waste loading.

2. Glass-forming components according to the amounts in Column D were added to the waste composition, producing the final glass composition shown in Column E. The exact amounts of glass-forming components used were calculated together with the Batch 87 waste components, so that the total amount of the components would achieve a molar ratio of $(R_2O+RO):R_2O_3:(RO_2+R_2O_5)$ within the range of about (1-1.3):(1-1.4):(1.2-4.2). The molar ratio achieved was approximately 1.03:1:2.

| A Oxides | B Waste (wt %) | C 50% Waste (wt %) | D Additives (wt %) | E Final Glass (wt %) |
|---|---|---|---|---|
| $Al_2O_3$ | 25.79 | 12.895 | 0 | 12.895 |
| $B_2O_3$ | 0.47 | 0.235 | 14.765 | 15 |
| $Bi_2O_3$ | 5.31 | 2.655 | 0 | 2.655 |
| CaO | 2.34 | 1.17 | 0 | 1.17 |
| $Cr_2O_3$ | 1.67 | 0.835 | 0 | 0.835 |
| F | 1.01 | 0.505 | 0.775 | 1.28 |
| $Fe_2O_3$ | 11.84 | 5.92 | 0 | 5.92 |
| $K_2O$ | 2.03 | 1.015 | 0 | 1.015 |
| $Li_2O$ | 0.04 | 0.02 | 3.74 | 3.76 |
| MgO | 0.56 | 0.28 | 0 | 0.28 |
| MnO | 2.56 | 1.28 | 0 | 1.28 |
| $Na_2O$ | 22.9 | 11.45 | 0 | 11.45 |
| NiO | 2.25 | 1.125 | 0 | 1.125 |
| $P_2O_5$ | 3.76 | 1.88 | 0 | 1.88 |
| PbO | 0.49 | 0.245 | 0 | 0.245 |
| $SiO_2$ | 5.16 | 2.58 | 32.42 | 35 |
| SrO | 0.22 | 0.11 | 0 | 0.11 |
| $ThO_2$ | 0.39 | 0.195 | 0 | 0.195 |
| $U_3O_8$ | 6.62 | 3.31 | 0 | 3.31 |
| $ZrO_2$ | 1.23 | 0.615 | 0 | 0.615 |

3. The mixture of step 1 and step 2 were stirred together for 1 hour at ambient temperature, producing an aqueous suspension.

4. The product of step 3 was then melted at 1150° C. for 5 hours in a muffle furnace, and then quenched.

5. The resultant glass was then tested to determine the suitability of this composition for processing using liquid-fed ceramic melter (LFCM) technology. The results demonstrated that the composition was suitable for processing using LFCM technology:
   (a) Crystallinity after being quenched: 0.3 vol % (spinel) crystals were found.
   (b) Crystallinity after 3 days at 950° C.: <0.5 vol % crystals (spinel) were found.

Viscosity, specific electrical resistivity, PCT and TCLP were not verified. Due to the similarity of the major glass components of this glass to those of C-106, the results were expected to be similar.

Example 12

Vitrifying Batch 34 Hanford High-Level Waste (HLW) Simulant with 50 Weight Percent Waste Loading 1. The Batch 34 waste composition from Column A was used according to the amounts in Column B. Column C shows the amount (in weight percent) of the components found in the final glass product with a 50 weight percent waste loading.

| A Oxides | B Waste (wt %) | C 50% Waste (wt %) | D Additives (wt %) | E Final Glass (wt %) |
|---|---|---|---|---|
| $Al_2O_3$ | 21.78 | 10.89 | 0 | 10.89 |
| $B_2O_3$ | 0.44 | 0.22 | 14.78 | 15 |
| $Bi_2O_3$ | 0.24 | 0.12 | 0 | 0.12 |
| CaO | 1.87 | 0.935 | 0 | 0.935 |
| $Cr_2O_3$ | 2.11 | 1.055 | 0 | 1.055 |
| F | 1.43 | 0.715 | 0.54 | 1.255 |
| $Fe_2O_3$ | 6.43 | 3.215 | 5.785 | 9 |
| $K_2O$ | 0.66 | 0.33 | 0.54 | 0.87 |
| $Li_2O$ | 0.14 | 0.07 | 1.77 | 1.84 |
| MgO | 0.04 | 0.02 | 1.79 | 1.81 |
| MnO | 1.03 | 0.515 | 4.485 | 5 |
| $Na_2O$ | 22.77 | 11.385 | 0 | 11.385 |

-continued

| A Oxides | B Waste (wt %) | C 50% Waste (wt %) | D Additives (wt %) | E Final Glass (wt %) |
|---|---|---|---|---|
| NiO | 0.65 | 0.325 | 0 | 0.325 |
| $P_2O_5$ | 1.83 | 0.915 | 0 | 0.915 |
| PbO | 0.42 | 0.21 | 0 | 0.21 |
| $SiO_2$ | 20.95 | 10.475 | 20.525 | 31 |
| SrO | 0.15 | 0.075 | 0 | 0.075 |
| $ThO_2$ | 0.33 | 0.165 | 0 | 0.165 |
| $U_3O_8$ | 11.11 | 5.555 | 0 | 5.555 |
| $ZrO_2$ | 5.19 | 2.595 | 0 | 2.595 |

2. Glass-forming components according to the amounts in Column D were added to the waste composition, producing the final glass composition shown in Column E. The exact amounts of glass-forming components used were calculated together with the Batch 34 waste components, so that the total amount of the components would achieve a molar ratio of $(R_2O+RO):R_2O_3:(RO_2+R_2O_5)$ within the range of about (1-1.3):(1-1.4):(1.2-4.2). The molar ratio achieved was approximately 1.1:1:2.

3. The mixture of step 1 and step 2 were stirred together for 1 hour at ambient temperature, producing an aqueous suspension.

4. The product of step 3 was then melted at 1150° C. for 5 hours in a muffle furnace, and then quenched.

5. The resultant glass was then tested to determine the suitability of this composition for processing using liquid-fed ceramic melter (LFCM) technology. The results demonstrated that the composition was suitable for processing using LFCM technology:
   (a) Crystallinity after being quenched: No crystals were found.
   (b) Crystallinity after 3 days at 950° C.: <0.1 vol % crystals (spinel) were found.

Viscosity, specific electrical resistivity, PCT and TCLP were not verified. Due to the similarity of the major glass components of this glass to those of C-106, the results were expected to be similar.

Example 13

Vitrifying Batch 32 Hanford High-Level Waste (HLW) Simulant with 50 Weight Percent Waste Loading 1. The Batch 32 waste composition from Column A was used according to the amounts in Column B. Column C shows the amount (in weight percent) of the components found in the final glass product with a 50 weight percent waste loading.

| A Oxides | B Waste (wt %) | C 50% Waste (wt %) | D Additives (wt %) | E Final Glass (wt %) |
|---|---|---|---|---|
| $Al_2O_3$ | 12.98 | 6.49 | 3.21 | 9.7 |
| $B_2O_3$ | 0.05 | 0.025 | 14.975 | 15 |
| $Bi_2O_3$ | 0.28 | 0.14 | 0 | 0.14 |
| CaO | 2.31 | 1.155 | 0 | 1.155 |
| $Cr_2O_3$ | 1.37 | 0.685 | 0 | 0.685 |
| F | 0.78 | 0.39 | 0.91 | 1.3 |
| $Fe_2O_3$ | 6.66 | 3.33 | 9.34 | 12.67 |
| $K_2O$ | 0.3 | 0.15 | 0.72 | 0.87 |
| $Li_2O$ | 0 | 0 | 1.9 | 1.9 |
| MgO | 0.02 | 0.01 | 1.8 | 1.81 |
| MnO | 0.72 | 0.36 | 4.84 | 5.2 |
| $Na_2O$ | 21.44 | 10.72 | 0 | 10.72 |

-continued

| A Oxides | B Waste (wt %) | C 50% Waste (wt %) | D Additives (wt %) | E Final Glass (wt %) |
|---|---|---|---|---|
| NiO | 0.2 | 0.1 | 0 | 0.1 |
| P$_2$O$_5$ | 1.9 | 0.95 | 0 | 0.95 |
| PbO | 0.37 | 0.185 | 0.005 | 0.19 |
| SiO$_2$ | 36.22 | 18.11 | 12.75 | 30.86 |
| SrO | 0.19 | 0.095 | 0.005 | 0.1 |
| ThO$_2$ | 0.26 | 0.13 | 0 | 0.13 |
| U$_3$O$_8$ | 12.3 | 6.15 | 0 | 6.15 |
| ZrO$_2$ | 0.37 | 0.185 | 0.185 | 0.37 |

2. Glass-forming components according to the amounts in Column D were added to the waste composition, producing the final glass composition shown in Column E. The exact amounts of glass-forming components used were calculated together with the Batch 32 waste components, so that the total amount of the components would achieve a molar ratio of (R$_2$O+RO):R$_2$O$_3$:(RO$_2$+R$_2$O$_5$) within the range of about (1-1.3):(1-1.4):(1.2-4.2). The molar ratio achieved was approximately 1:1.16:2.

3. The mixture of step 1 and step 2 were stirred together for 1 hour at ambient temperature, producing an aqueous suspension.

4. The product of step 3 was then melted at 1150° C. for 5 hours in a muffle furnace, and then quenched.

5. The resultant glass was then tested to determine the suitability of this composition for processing using liquid-fed ceramic melter (LFCM) technology. The results of six tests demonstrated that the composition was suitable for processing using LFCM technology:
   (a) Crystallinity after being quenched: No crystals were found.
   (b) Crystallinity after 3 days at 950° C.: <1 vol % crystals (spinel) were found.

Viscosity, specific electrical resistivity, PCT and TCLP were not verified. Due to the similarity of the major glass components of this glass to those of C-106, the results were expected to be similar.

Example 14

Vitrifying Batch 20 Hanford High-Level Waste (HLW) Simulant with 40 Weight Percent Waste Loading 1. The Batch 20 waste composition from Column A was used according to the amounts in Column B. Column C shows the amount (in weight percent) of the components found in the final glass product with a 40 weight percent waste loading.

2. Glass-forming components according to the amounts in Column D were added to the waste composition, producing the final glass composition shown in Column E. The exact amounts of glass-forming components used were calculated together with the Batch 20 waste components, so that the total amount of the components would achieve a molar ratio of (R$_2$O+RO): R$_2$O$_3$:(RO$_2$+R$_2$O$_5$) within the range of about (1-1.3):(1-1.4):(1.2-4.2). The molar ratio achieved was approximately 1:1.19:2.

| A Oxides | B Waste (wt %) | C 40% Waste (wt %) | D Additives (wt %) | E Final Glass (wt %) |
|---|---|---|---|---|
| Al$_2$O$_3$ | 6.8 | 2.72 | 7.023 | 9.743 |
| B$_2$O$_3$ | 0.62 | 0.248 | 15.015 | 15.263 |
| BaO | 0.25 | 0.1 | 0 | 0.1 |
| Bi$_2$O$_3$ | 3.82 | 1.528 | 0 | 1.528 |

-continued

| A Oxides | B Waste (wt %) | C 40% Waste (wt %) | D Additives (wt %) | E Final Glass (wt %) |
|---|---|---|---|---|
| CaO | 0.71 | 0.284 | 0.747 | 1.031 |
| Ce$_2$O$_3$ | 0.37 | 0.148 | 0 | 0.148 |
| Cl | 0.148 | 0.0592 | 0.0888 | 0.148 |
| Cr$_2$O$_3$ | 0.18 | 0.072 | 0.034 | 0.106 |
| Cs$_2$O | 0.068 | 0.0272 | 0.0408 | 0.068 |
| CuO | 0.061 | 0.0244 | 0.0366 | 0.061 |
| F | 2.37 | 0.948 | 0.337 | 1.285 |
| Fe$_2$O$_3$ | 14.4 | 5.76 | 11.813 | 17.573 |
| K$_2$O | 0.46 | 0.184 | 0.692 | 0.876 |
| La$_2$O$_3$ | 0.2 | 0.08 | 0.251 | 0.331 |
| MgO | 0.55 | 0.22 | 1.594 | 1.814 |
| MnO | 6.35 | 2.54 | 2.9358 | 5.4758 |
| Na$_2$O | 12.65 | 5.06 | 4.524 | 9.584 |
| Nd$_2$O$_3$ | 0.32 | 0.128 | 0.077 | 0.205 |
| NiO | 0.45 | 0.18 | 0.055 | 0.235 |
| P$_2$O$_5$ | 0.74 | 0.296 | 0 | 0.296 |
| PbO | 0.76 | 0.304 | 0 | 0.304 |
| SiO$_2$ | 4.67 | 1.868 | 28.994 | 30.862 |
| SrO | 12.66 | 5.064 | 0 | 5.064 |
| TiO$_2$ | 0.194 | 0.0776 | 0.1164 | 0.194 |
| U$_3$O$_8$ | 6.18 | 2.472 | 0 | 2.472 |
| ZrO$_2$ | 22.96 | 9.184 | 0 | 9.184 |
| Li$_2$O | 1.842 | 0.7368 | 1.1052 | 1.842 |
| ZnO | 0.095 | 0.038 | 0.057 | 0.095 |

3. The mixture of step 1 and step 2 were stirred together for 1 hour at ambient temperature, producing an aqueous suspension.

4. The product of step 3 was then melted at 1150° C. for 5 hours in a muffle furnace, and then quenched.

5. The resultant glass was then tested to determine the suitability of this composition for processing using liquid-fed ceramic melter (LFCM) technology. The results demonstrated that the composition was suitable for processing using LFCM technology:
   (a) Crystallinity after being quenched: <0.3 vol % (spinel) crystals were found.
   (b) Crystallinity after 3 days at 950° C.: <2 vol % crystals (spinel) were found. Average size <10 microns.

Viscosity, specific electrical resistivity, PCT and TCLP were not verified. Due to the similarity of the major glass components of this glass to those of C-106, the results were expected to be similar.

Example 15

Vitrifying Batch 4 Hanford High-Level Waste (HLW) Simulant with 40 Weight Percent Waste Loading 1. The Batch 4 waste composition from Column A was used according to the amounts in Column B. Column C shows the amount (in weight percent) of the components found in the final glass product with a 40 weight percent waste loading.

2. Glass-forming components according to the amounts in Column D were added to the waste composition, producing the final glass composition shown in Column E. The exact amounts of glass-forming components used were calculated together with the Batch 4 waste components, so that the total amount of the components would achieve a molar ratio of (R$_2$O+RO):R$_2$O$_3$:(RO$_2$+R$_2$O$_5$) within the range of about (1-1.3):(1-1.4):(1.2-4.2). The molar ratio achieved was approximately 1:1.28:2.

| A Oxides | B Waste (wt %) | C 40% Waste (wt %) | D Additives (wt %) | E Final Glass (wt %) |
|---|---|---|---|---|
| Al₂O₃ | 7.05 | 2.82 | 7.18 | 10 |
| B₂O₃ | 0.33 | 0.132 | 14.868 | 15 |
| Bi₂O₃ | 0.01 | 0.004 | 0 | 0.004 |
| CaO | 2.93 | 1.172 | 0 | 1.172 |
| Cr₂O₃ | 0.19 | 0.076 | 0 | 0.076 |
| F | 0.04 | 0.016 | 1.264 | 1.28 |
| Fe₂O₃ | 46.2 | 18.48 | 0 | 18.48 |
| K₂O | 0.15 | 0.06 | 0.81 | 0.87 |
| Li₂O | 0 | 0 | 1.84 | 1.84 |
| MgO | 2.01 | 0.804 | 0 | 0.804 |
| MnO | 8.9 | 3.56 | 0 | 3.56 |
| Na₂O | 14.09 | 5.636 | 3.944 | 9.58 |
| NiO | 1.45 | 0.58 | 0 | 0.58 |
| P₂O₅ | 0.61 | 0.244 | 0 | 0.244 |
| PbO | 1.45 | 0.58 | 0 | 0.58 |
| SiO₂ | 5.26 | 2.104 | 30.896 | 33 |
| SrO | 0.16 | 0.064 | 1.196 | 1.26 |
| ThO₂ | 0 | 0 | 0 | 0 |
| U₃O₈ | 1.44 | 0.576 | 0 | 0.576 |
| ZrO₂ | 0.62 | 0.248 | 0 | 0.248 |

3. The mixture of step 1 and step 2 were stirred together for 1 hour at ambient temperature, producing an aqueous suspension.

4. The product of step 3 was then melted at 1150° C. for 5 hours in a muffle furnace, and then quenched.

5. The resultant glass was then tested to determine the suitability of this composition for processing using liquid-fed ceramic melter (LFCM) technology. The results demonstrated that the composition was suitable for processing using LFCM technology:

(a) Crystallinity after being quenched: No crystals were found.

(b) Crystallinity after 3 days at 950° C.: <1 vol % crystals (spinel) were found.

Viscosity, specific electrical resistivity, PCT and TCLP were not verified. Due to the similarity of the major glass components of this glass to those of C-106, the results were expected to be similar.

Example 16

Vitrifying Batch 30 Hanford High-Level Waste (HLW) Simulant with 40 Weight Percent Waste Loading 1. The Batch 30 waste composition from Column A was used according to the amounts in Column B. Column C shows the amount (in weight percent) of the components found in the final glass product with a 40 weight percent waste loading.

| A Oxides | B Waste (wt %) | C 40% Waste (wt %) | D Additives (wt %) | E Final Glass (wt %) |
|---|---|---|---|---|
| Al₂O₃ | 15.65 | 6.26 | 7.74 | 14 |
| B₂O₃ | 0.49 | 0.196 | 14.804 | 15 |
| Bi₂O₃ | 0.11 | 0.044 | 0 | 0.044 |
| CaO | 0.59 | 0.236 | 0 | 0.236 |
| Cr₂O₃ | 5.41 | 2.164 | 0 | 2.164 |
| F | 0.86 | 0.344 | 0.936 | 1.28 |
| Fe₂O₃ | 6.66 | 2.664 | 6.736 | 9.4 |
| K₂O | 2.37 | 0.948 | 0 | 0.948 |
| Li₂O | 0.05 | 0.02 | 0 | 0.02 |
| MgO | 0.4 | 0.16 | 0 | 0.16 |
| MnO | 1.44 | 0.576 | 0 | 0.576 |
| Na₂O | 49.3 | 19.72 | 0 | 19.72 |
| NiO | 0.35 | 0.14 | 0 | 0.14 |
| P₂O₅ | 2.74 | 1.096 | 0 | 1.096 |
| PbO | 0.36 | 0.144 | 0 | 0.144 |
| SiO₂ | 0.47 | 0.188 | 30.812 | 31 |
| SrO | 0.03 | 0.012 | 0 | 0.012 |
| ThO₂ | 0.22 | 0.088 | 0 | 0.088 |
| U₃O₈ | 3.93 | 1.572 | 0.007 | 1.579 |
| ZrO₂ | 5.99 | 2.396 | 0 | 2.396 |

2. Glass-forming components according to the amounts in Column D were added to the waste composition, producing the final glass composition shown in Column E. The exact amounts of glass-forming components used were calculated together with the Batch 30 waste components, so that the total amount of the components would achieve a molar ratio of $(R_2O+RO):R_2O_3:(RO_2+R_2O_5)$ within the range of about (1-1.3):(1-1.4):(1.2-4.2). The molar ratio achieved was approximately 1:1.06:2.

3. The mixture of step 1 and step 2 were stirred together for 1 hour at ambient temperature, producing an aqueous suspension.

4. The product of step 3 was then melted at 1150° C. for 5 hours in a muffle furnace, and then quenched.

5. The resultant glass was then tested to determine the suitability of this composition for processing using liquid-fed ceramic melter (LFCM) technology. The results demonstrated that the composition was suitable for processing using LFCM technology:

(a) Crystallinity after being quenched: No crystals were found.

(b) Crystallinity after 3 days at 950° C.: <1 vol % crystals (spinel) were found.

Viscosity, specific electrical resistivity, PCT and TCLP were not verified. Due to the similarity of the major glass components of this glass to those of C-106, the results were expected to be similar.

Example 17

Vitrifying Savannah River Sludge Batch 2 High-Level Waste (HLW) Simulant With 40 Weight Percent Waste Loading 1. The Savannah River Sludge Batch 2 waste composition from Column A was used according to the amounts in Column B. Column C shows the amount (in weight percent) of the components found in the final glass product with a 40 weight percent waste loading.

| A Oxides | B Waste (wt %) | C 40% Waste (wt %) | D Additives (wt %) | E Final Glass (wt %) |
|---|---|---|---|---|
| Al₂O₃ | 17.03 | 6.812 | 1.188 | 8 |
| B₂O₃ | 0 | 0 | 14 | 14 |
| BaO | 0.27 | 0.108 | 0 | 0.108 |
| CaO | 3.81 | 1.524 | 0 | 1.524 |
| Cr2O3 | 0.37 | 0.148 | 0 | 0.148 |
| Cu₂O | 0.2 | 0.08 | 0 | 0.08 |
| F | 0 | 0 | 2.4 | 2.4 |
| Fe₂O₃ | 42.76 | 17.104 | 0 | 17.104 |
| K₂O | 0.08 | 0.032 | 0 | 0.032 |
| Li₂O | 0 | 0 | 3 | 3 |

-continued

| A Oxides | B Waste (wt %) | C 40% Waste (wt %) | D Additives (wt %) | E Final Glass (wt %) |
|---|---|---|---|---|
| MgO | 0.23 | 0.092 | 0 | 0.092 |
| MnO2 | 4.82 | 1.928 | 0 | 1.928 |
| Na$_2$O | 12.23 | 4.892 | 7.608 | 12.5 |
| NiO | 2.2 | 0.88 | 0 | 0.88 |
| PbO | 0.33 | 0.132 | 0 | 0.132 |
| SiO$_2$ | 2 | 0.8 | 31.8 | 32.6 |
| SrO | 0.1 | 0.04 | 0 | 0.04 |
| U$_3$O$_8$ | 12.37 | 4.948 | 0 | 4.948 |
| ZnO | 0.39 | 0.156 | 0 | 0.156 |
| ZrO$_2$ | 0.79 | 0.316 | 0 | 0.316 |

2. Glass-forming components according to the amounts in Column D were added to the waste composition, producing the final glass composition shown in Column E. The exact amounts of glass-forming components used were calculated together with the Batch 2 waste components, so that the total amount of the components would achieve a molar ratio of (R$_2$O+RO):R$_2$O$_3$:(RO$_2$+R$_2$O$_5$) within the range of about (1-1.3):(1-1.4):(1.2-4.2). The molar ratio achieved was approximately 1:1.22:1.7.

3. The mixture of step 1 and step 2 were stirred together for 1 hour at ambient temperature, producing an aqueous suspension.

4. The product of step 3 was then melted at 1150° C. for 5 hours in a muffle furnace, and then quenched.

5. The resultant glass was then tested to determine the suitability of this composition for processing using liquid-fed ceramic melter (LFCM) technology. The results demonstrated that the composition was suitable for processing using LFCM technology:

(a) Crystallinity after being quenched: No crystals were found.
    (b) Crystallinity after 3 days at 950° C.: <1 vol % crystals (spinel) were found.

Viscosity, specific electrical resistivity, PCT and TCLP were not verified. Due to the similarity of the major glass components of this glass to those of C-106, the results were expected to be similar.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A borosilicate glass consisting essentially of: about 1 to about 1.3 mole parts of a combination of monovalent cation oxides (R$_2$O) and divalent cation oxides (RO); about 1 to about 1.4 mole parts trivalent cation oxides (R$_2$O$_3$); about 1.2 to about 4.2 mole parts of a combination of tetravalent cation oxides (RO$_2$) and pentavalent cation oxides (R$_2$O$_5$); and wherein SiO$_2$ is present in an amount greater than 30 weight percent, B$_2$O$_3$ is present in an amount between 8.7 and 15.3 weight percent, Al$_2$O$_3$ is present in an amount between 7 and 15.1 weight percent, CaO is present in an amount between 0.2 and 2.3 weight percent, and fluorine is present in an amount between about 1 to about 3 weight percent.

2. The borosilicate glass, according to claim 1, consisting essentially of: about 1 to about 1.3 mole parts of a combination of monovalent cation oxides (R$_2$O) and divalent cation oxides (RO), including alkaline oxides and alkaline earth oxides; about 1 to about 1.4 mole parts trivalent cation oxides (R$_2$O$_3$), including alumina, boric oxide, and ferric oxide; about 1.2 to about 4.2 mole parts of a combination of tetravalent cation oxides (RO$_2$) and pentavalent cation oxides (R$_2$O$_5$), including silica, zirconia, titania, and phosphoric oxide; and about 1 to about 3 weight percent fluorine; wherein SiO$_2$ is present in an amount greater than 30 weight percent, B$_2$O$_3$ is present in an amount between 8.7 and 15.3 weight percent, Al$_2$O$_3$ is present in an amount between 7 and 15.1 weight percent, and CaO is present in an amount between 0.2 and 2.3 weight percent.

3. The borosilicate glass of claim 1, wherein the borosilicate glass is peraluminous.

4. The borosilicate glass of claim 1, wherein the borosilicate glass has a viscosity of 2 to 10 Pascal second at a temperature of about 1150 to about 1200 degrees Celsius.

5. The borosilicate glass of claim 1, wherein the borosilicate glass has a calculated degree of polymerization (K) less than about 15.

6. The borosilicate glass of claim 1, wherein the borosilicate glass has a calculated degree of polymerization (K) less than about 7.

7. The borosilicate glass of claim 1, wherein the borosilicate glass has crystallinity of less than 1 volume percent at about 1150 degrees Celsius, and crystallinity of up to 2 volume percent after three days at about 950 degrees Celsius.

8. The borosilicate glass of claim 1, wherein the borosilicate glass has specific electrical resistivity ranging between about 1.4 Ωcm to about 10 Ωcm at about 1150 degrees Celsius, that is acceptable for processing in vitrification melters.

9. The borosilicate glass of claim 1, wherein the borosilicate glass meets the leaching requirements of less than about 1.19 grams per square meter per day for boron, less than about 0.69 grams per square meter per day for lithium, and less than about 0.95 grams per square meter per day for sodium, for acceptance in U.S. high-level waste repositories.

10. The borosilicate glass of claim 1, wherein the borosilicate glass contains fluorine in an amount between about 1.2 and about 2.5 weight percent.

* * * * *